(12) United States Patent
Fried et al.

(10) Patent No.: US 6,470,568 B2
(45) Date of Patent: Oct. 29, 2002

(54) METHOD FOR REPAIRING A GAS TURBINE COMPONENT

(75) Inventors: Reinhard Fried, Nussbaumen; Andreas Bögli, Wettingen, both of (CH)

(73) Assignee: ALSTOM (Switzerland) Ltd, Baden (CH)

(*) Notice: Subject to any disclaimer, the term of this patent is extended or adjusted under 35 U.S.C. 154(b) by 0 days.

(21) Appl. No.: 09/790,703

(22) Filed: Feb. 23, 2001

(65) Prior Publication Data

US 2001/0025417 A1 Oct. 4, 2001

(30) Foreign Application Priority Data

Feb. 23, 2000 (DE) .......................................... 100 08 257

(51) Int. Cl.⁷ ................................................. B23P 15/00
(52) U.S. Cl. ...................................... 29/889.1; 228/119
(58) Field of Search ........................... 29/889.1, 402.13, 29/402; 228/119

(56) References Cited

U.S. PATENT DOCUMENTS

| | | |
|---|---|---|
| 3,155,491 A | 11/1964 | Hoppin, III |
| 4,381,944 A | 5/1983 | Smith, Jr. et al. |
| 4,493,451 A | 1/1985 | Clark et al. |
| 4,726,101 A | 2/1988 | Draghi et al. |
| 4,957,543 A | 9/1990 | Babjak et al. |
| 5,156,321 A | 10/1992 | Liburdi et al. |
| 5,395,584 A | 3/1995 | Berger et al. |
| 5,437,737 A | 8/1995 | Draghi et al. |
| 5,503,941 A * | 4/1996 | Pruyn .......................... 428/613 |
| 5,584,983 A | 12/1996 | Pruyn |
| 5,666,643 A | 9/1997 | Chesnes et al. |
| 5,976,454 A * | 11/1999 | Sterzel et al. .................. 264/43 |
| 5,998,317 A * | 12/1999 | Sterzel .......................... 264/44 |
| 6,153,547 A * | 11/2000 | Sterzel ......................... 501/103 |
| 6,276,597 B1 * | 8/2001 | Budinger et al. ........... 228/225 |
| 6,283,356 B1 * | 9/2001 | Messelling .................. 164/92.1 |

FOREIGN PATENT DOCUMENTS

WO 00/00673 1/2000

OTHER PUBLICATIONS

Jul. 25, 1998 letter from RECEMAT® International (112–200–RCM/ABB Corporate Research) to Herrn R. Fried, ABB Corporate Research Ltd.
SEAC International B.V., RECEMAT® International brochure "RECEMAT metal foam", Apr. 30, 1998, pp. 1–4.
SEAC International B.V., RECEMAT® Metal Foam Standard Specification, 1998–1999, pp. 1–3.
SEAC International B.V., "Metallschaum" information.
Sumitomo Electric Industries, Ltd., Electronic Materials Division brochure "CELMET High–Porosity Metal".
CELMET brochure "Celmet Processing Examples".

* cited by examiner

Primary Examiner—I. Cuda-Rosenbaum
(74) Attorney, Agent, or Firm—Burns, Doane, Swecker & Mathis, L.L.P.

(57) ABSTRACT

In a soldering process for treating tears, recesses, or other material defects in the surface of thermally and mechanically highly stressed components of gas turbines, a nickel foam is applied together with the soldering powder, which can also be mixed with another filler. After this, a heat treatment of the soldering process is performed.

14 Claims, 1 Drawing Sheet

METHOD FOR REPAIRING A GAS TURBINE COMPONENT

FIELD OF THE INVENTION

The invention relates to a soldering method, and a soldering method for repairing a component of a gas turbine damaged both by high thermal as well as mechanical stresses.

BACKGROUND OF THE INVENTION

Turbine blades of gas turbines are subject to high thermal and mechanical loads during operation. Because of different extreme stresses, these loads result in various material defects. On the one hand, high fluctuations in temperature and centrifugal forces result in tension that causes tears. In addition, oxidation, corrosion, erosion or abrasion may cause larger material defects, such as recesses, holes, or other disadvantageous types of material removal. To extend the life span of the damaged parts and prevent a cost-intensive replacement with new parts, the state of the art provides many repair methods that strive to eliminate material defects and also restore the original shape of the turbine blade.

U.S. Pat. No. 4,726,101 discloses a method for repairing a turbine blade which utilizes a tape consisting of soldering powder and a binder applied to the turbine components and is heated. The base material and the tape fuse by way of diffusion during the heat treatment that follows. In order to lower the fusion point of the soldering powder, which principally has a similar composition as the base material, 1.5% boron is added to it. Use of several layers of tape is also possible. The tape contains 30–40% plastic binder (organic binder) that must evaporate during the subsequent soldering process and which may leave behind undesirable pores or residues (carbon, ash), resulting in reduced strength and quality. The heat treatment also causes the tape to shrink.

Also known are several sintering processes that use soldering powders. Such a method is described, for example, in publication U.S. Pat. No. 5,156,321. The soldering powder is applied to the surface of the base material and is then heated to such an extent that the fusion temperature of the soldering powder is exceeded, i.e., it melts, while the base material remains solid. The liquid soldering materials sinters together and by way of a capillary effect in the tear, diffuses into an area of the base material near the latter's surface. This creates a relatively dense solder layer. Also known from publication U.S. Pat. No. 4,381,944 are other methods for repairing tears using two alloys that are present in powder form. However, joints made with soldering powder are less advantageous in that they are not sufficiently temperature-resistant, i.e., the ability of the soldering joint to manage stress deteriorates as the temperature increases.

A method which utilizes with a tape or, optionally, pre-sintered soldering powder, is also known from publication U.S. Pat. No. 5,666,643. For additional stability, particles with a high fusion point are added to the soldering material. Although pre-sintered soldering powders do not typically shrink, they have the disadvantage that they are inflexible when cold, i.e., it is difficult to adapt them to a predefined contour such as the contour presented by a component such as a turbine blade.

Many alloys are known that are principally suited for soldering processes. For example, U.S. Pat. No. 3,155,491, discloses such a soldering alloy.

SUMMARY OF THE INVENTION

The present invention provides a soldering method and material for repairing components, such as damaged turbine blades, that can be used in a simple manner and avoids the disadvantages associated with the state of the art.

According to one aspect, the present invention provides a soldering method for repairing tears and material defects in a surface of thermally and mechanically highly stressed components comprising a base material, the method comprising the steps of:

(a) applying an open-celled metallic foam to the tear or material defect;

(b) introducing of soldering powder into the pores of the metallic foam; and (c) heating the powder containing foam to a temperature which is above the melting temperature of the soldering powder.

According to another aspect, the present invention provides in combination: a highly thermally and mechanically stressed component formed of a base material; and an open-celled metallic foam applied to a surface of the base material.

According to the present invention, it is advantageous for the metallic foam to be shapeable and easily adaptable to the contour of the base material. In one advantageous embodiment, the open-pored metallic foam has a porosity of 60–95%. This ensures a sufficient capillary effect of the metallic foam.

According to a further aspect, a filler is added to the soldering powder and is introduced into the pores of the metallic foam. In another advantageous embodiment, the composition was selected so that the filling material and/or the metallic foam are metallurgically close to the composition of the base material of the component to be repaired.

According to the present invention, it may be advantageous to apply small amounts of a binder to the surface of the metallic foam after the soldering powder has been filled in. This is particularly effective in preventing the unintentional falling out of soldering powder during careless handling. The applied binder is able to simply evaporate, since it has only been applied to the surface, and therefore need not diffuse out of the pores of the metallic foam.

By adapting the chemical composition of the metallic foam, the method according to the invention also can be used advantageously to specially protect areas subject to extreme oxidation.

DETAILED DESCRIPTION OF THE INVENTION

Figure 1:
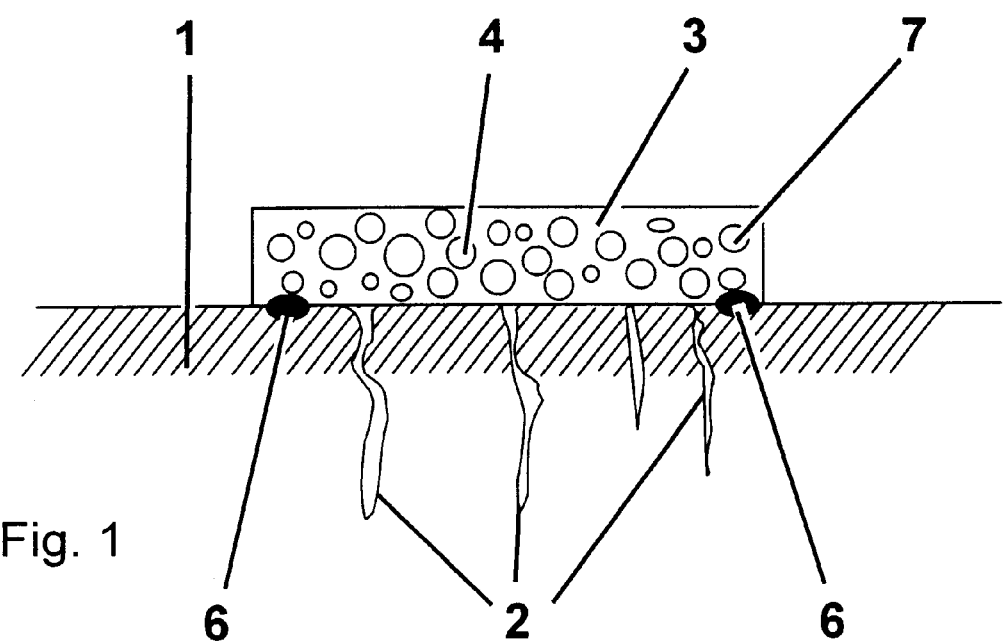
FIG. 1 an exemplary embodiment according to the invention of tears in a component to be repaired with metallic foam and soldering powder.

FIG. 1 shows a section through the surface of a base material 1 that exhibits several tears 2 caused by external stresses. The invention relates to a method for repairing such tears 2 and other material defects, for example, a recess 5 created by erosion (FIG. 2) on the surface of thermally and mechanically highly stressed components, for example on turbine blades or combustion chamber parts of gas turbines. The soldering method according to the invention uses metallic foam 3 and soldering powder 4 for the repair. It is also within the scope of the present invention to grind out a tear 2 prior to performing the method according to the invention.

First the metallic foam 3 is applied to the site to be repaired, i.e., the tear 2. This may be accomplished by a simple spot-attachment to discrete attachment points 6. The metallic foam 3 is very easily shaped and can be correctly sized by cutting. Simple tools can be used for cutting. Because of the high plastic shapeability of the metallic foam 3, it even can be adapted exactly to the shape of the material defect by hand, without additional tools. During this preparation, attention should be paid to the fact that the metallic foam 3 will melt during the subsequent heat treatment, i.e., its original volume is reduced. During the repair of the recess 5 in FIG. 2, the metallic foam 3 is applied to the surface in such a way that it forms a smooth surface by itself. As a result, the areas near the edge are denser than the center area.

Methods for producing metallic foams 3 suitable for use with the present invention, in particular of nickel foam, and the properties of these different metallic foams 3 per se, are known, for example, from publications WO 00/00673, U.S. Pat. No. 5,584,983, and/or U.S. Pat. No. 4,957,543, each of which is incorporated herein by reference, in their entirety. Metallic foams 3 based on nickel or nickel-chromium are suitable for use with the present invention. Such foams are also available from SEAC International BV, P.O. Box 142 2920 AC Krimpen a/d Ijssel, The Netherlands. These are distributed under the brand name "RECEMAT® International".

It is, for example, possible to use a nickel foam as a metallic foam 3, in particular with turbine blades formed of a nickel base super alloy. Naturally, an alloy based on another material also could be used for the metallic foam 3.

In a second step of the process, a soldering powder 4 is filled into the pores 7 of the metallic foam 3. A material known from the state of the art can be used as a soldering powder 4. These soldering powders 4 are numerous and known from the state of the art. Usually, small amounts of boron or silicon are added to the soldering powder 4 in order to lower its fusion point. Such alloys are known, for example, from publication U.S. Pat. No. 3,155,491, the disclosure of which is incorporated herein by reference, in its entirety.

It would also be conceivable to introduce an additional filling material along with the soldering powder 4 into the pores 7 of the metallic foam 3. Such a filler preferably should consist of the same material as the component to be repaired. This makes it possible to ensure that the material properties of a repaired material defect correspond better to the properties of the base material 1.

Since the metallic foam 3 exhibits a certain porosity and open-celled structure, the soldering powder 4 is able to get into the fine pores of the metallic foam 3 by slight shaking or tapping. For the purposes of this invention, the porosity of foam 3 is approximately 60–95%. To ensure optimum diffusion of the solder, the wall thickness of the individual fibers should not be greater than 300 $\mu$m. This is the minimum diffusion distance of the pure solder during a normal heat treatment. By using a suitable metallic foam composition, the method according to the invention also can be used advantageously for the special protection of areas subject to extreme oxidation.

According to the present invention, a conventional metallic foam can be modified in different ways: by CVD coating of the foam, preparation of the foam from a corresponding alloy or ion implantation. For such foams, a macroscopic porosity gradient can be produced, in which the outward facing part (the part facing away from the surface of the part to be repaired) has a lower porosity, i.e., is denser, than the part facing the surface to be repaired of the base material 1. This results in a concentration of certain elements in the part facing outward. In another modification, an enrichment with Y (yttrium) would be conceivable in order to achieve higher oxidation resistance. In the case of increased abrasion resistance, the inclusion of corresponding hard phases in the foam could be desirable.

The subsequent heat treatment of the soldering process, in which a temperature above the fusion temperature of the soldering powder 4 is used, causing the power to melt and form a homogenous structure together with the metallic foam 3. The fusion temperature of the homogeneous mixture may vary, depending on whether an additional filler is also introduced into the pores of the metallic foam 3. As a rule of thumb, the higher the filler content, the higher this temperature becomes.

Figure 2:
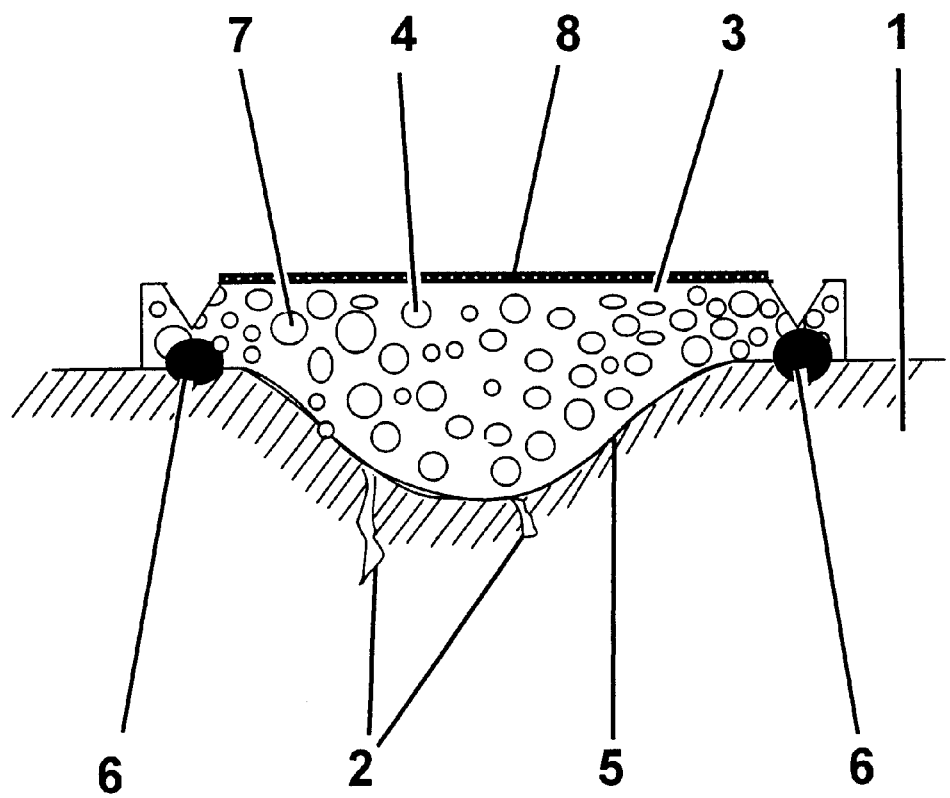
FIG. 2 another exemplary embodiment according to the invention of a recess and tears in a component to be repaired with metallic foam and soldering powder.

As shown in FIG. 2, it may be advantageous, in order to further support the soldering process, to apply small amounts of a filler 8 to the surface of the metallic foam 3 and the soldering powder 4. The filler or binder 8 prevents the unintentional falling out of soldering powder. During the thermal heat treatment of the soldering process, binder 8 can easily evaporate since it was applied only to the surface of the metallic foam 3.

The method according to the invention creates a soldering joint with advantageously improved mechanical properties. The soldering compound also can be used at increased temperatures without losses in its strength.

While the present invention has been described by reference to the above-mentioned embodiments, certain modifications and variations will be evident to those of ordinary skill in the art. Therefore the present invention is to be limited only by the scope and spirit of the appended claims.

What is claimed is:

1. A soldering method for repairing tears and material defects in a surface of thermally and mechanically highly stressed components comprising a base material, the method comprising the steps of:
   (a) applying an open-celled metallic foam having pores to the tear or material defect;
   (b) introducing a soldering powder into the pores of the metallic foam; and
   (c) heating the powder containing foam to a temperature which is above the melting temperature of the soldering powder.

2. The soldering method as claimed in claim 1, further comprising adding a filler that has a metallurgically similar composition to the base material into the pores of the metallic foam.

3. The soldering method as claimed in claim 1 further comprising applying a binder to the surface of the metallic foam after the introduction of the soldering powder.

4. The soldering method as claimed in claim 1, wherein step (a) comprises mechanically attaching the metallic foam to discrete points on the surface of the base material.

5. The soldering method as claimed claim 1, further comprising grinding out the tear or material defect before step (a).

6. The soldering method as claimed in claim 1, wherein the component is a turbine blade made of a nickel or cobalt base super alloy.

7. The soldering method as claimed in claim 1, wherein the metallic foam has a porosity of 60–95%.

8. The soldering method as claimed in claim 1, wherein the metallic foam has a variable porosity.

9. The soldering method as claimed in claim 1, wherein the metallic foam has a porosity that varies through a thickness of the metallic foam such that the porosity is greater towards the surface of the base material than at a surface away from the base material.

10. The soldering method as claimed in claim 1, wherein the metallic foam has a macroscopic porosity gradient.

11. The soldering method as claimed in claim 1, wherein the metallic foam includes individual fibers having a maximum wall thickness of 300 $\mu$m.

12. The soldering method as claimed in claim 1, wherein the metallic foam has a similar metallurgical composition as the base material of the component.

13. The soldering method as claimed in claim 1, wherein the metallic foam further comprises yttrium.

14. The soldering method as claimed in claim 1, wherein the metallic foam is a pure nickel or cobalt foam.

* * * * *